United States Patent
Gschwind et al.

(10) Patent No.: US 9,471,340 B2
(45) Date of Patent: *Oct. 18, 2016

(54) GLOBAL ENTRY POINT AND LOCAL ENTRY POINT FOR CALLEE FUNCTION

(71) Applicant: International Business Machines Corporation, Armonk, NY (US)

(72) Inventors: Michael K. Gschwind, Chappaqua, NY (US); Ulrich Weigand, Holzgerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/483,538

(22) Filed: Sep. 11, 2014

(65) Prior Publication Data
US 2015/0309812 A1    Oct. 29, 2015

Related U.S. Application Data

(63) Continuation of application No. 14/263,135, filed on Apr. 28, 2014, now Pat. No. 9,329,875.

(51) Int. Cl.
| | | |
|---|---|---|
| G06F 9/44 | (2006.01) | |
| G06F 9/445 | (2006.01) | |
| G06F 9/45 | (2006.01) | |

(52) U.S. Cl.
CPC ............. G06F 9/44521 (2013.01); G06F 8/41 (2013.01); G06F 9/4426 (2013.01)

(58) Field of Classification Search
None
See application file for complete search history.

(56) References Cited

U.S. PATENT DOCUMENTS

| | | | | | |
|---|---|---|---|---|---|
| 5,797,014 A | * | 8/1998 | Gheith | ...................... | G06F 8/41 717/163 |
| 6,016,399 A | * | 1/2000 | Chang | ................... | G06F 8/4452 717/142 |
| 6,219,830 B1 | * | 4/2001 | Eidt | ..................... | G06F 9/44521 710/68 |
| 6,321,275 B1 | * | 11/2001 | McQuistan | ............. | G06F 9/547 719/330 |
| 6,408,433 B1 | * | 6/2002 | Click, Jr. | ................. | G06F 8/447 717/154 |

(Continued)

OTHER PUBLICATIONS

Lupo, Wilken, "Post Register Allocation Spill Code Optimization"; 2006 IEEE; [retrieved on Jun. 27, 2016]; Retrieved from Internet <URL:http://dl.acm.org/citation.cfm?id=1122409>;pp. 1-11.*

(Continued)

*Primary Examiner* — Xi D Chen
(74) *Attorney, Agent, or Firm* — Cantor Colburn LLP; Steve Bennett

(57) ABSTRACT

Embodiments relate to a global entry point and a local entry point for a callee function. An aspect includes executing, by a processor, a function call from a calling function to the callee function. Another aspect includes, based on the function call being a direct and external function call, entering the callee function at the global entry point and executing prologue code in the callee function that calculates and stores a table of contents (TOC) value for the callee function in a TOC register. Another aspect includes, based on the function call being a direct and local function call, entering the callee function at the local entry point, wherein entering the callee function at the local entry point skips the prologue code. Another aspect includes, based on the function call being an indirect function call, entering the callee function at the global entry point and executing the prologue code.

11 Claims, 9 Drawing Sheets

(56) References Cited

U.S. PATENT DOCUMENTS

| | | | | |
|---|---|---|---|---|
| 6,523,171 | B1* | 2/2003 | Dupuy | G06F 8/51 717/142 |
| 6,671,878 | B1* | 12/2003 | Bliss | G06F 8/4452 717/141 |
| 6,892,379 | B2* | 5/2005 | Huang | G06F 8/447 717/141 |
| 7,185,323 | B2* | 2/2007 | Nair | G06F 8/433 717/141 |
| 7,921,418 | B2* | 4/2011 | Nair | G06F 8/443 717/141 |
| 8,196,110 | B2* | 6/2012 | Cabrera Escandell | G06F 21/54 717/141 |
| 8,307,351 | B2* | 11/2012 | Weigert | G06F 21/105 717/142 |
| 8,490,184 | B2* | 7/2013 | Brinker | G06F 21/51 717/126 |
| 8,583,939 | B2* | 11/2013 | Lee | G06F 21/54 713/190 |
| 8,601,456 | B2* | 12/2013 | Duffy | G06F 8/434 717/142 |
| 8,910,130 | B2* | 12/2014 | Munster | G06F 8/52 717/142 |
| 2005/0183072 | A1* | 8/2005 | Horning | G06F 21/14 717/140 |
| 2005/0273772 | A1* | 12/2005 | Matsakis | G06F 8/41 717/136 |
| 2007/0157178 | A1* | 7/2007 | Kogan | G06F 8/443 717/130 |
| 2008/0046870 | A1* | 2/2008 | Nair | G06F 8/443 717/140 |
| 2009/0193400 | A1* | 7/2009 | Baev | G06F 8/443 717/140 |
| 2010/0192135 | A1* | 7/2010 | Krishnaswamy | G01R 31/3183 717/140 |
| 2012/0159463 | A1* | 6/2012 | Druch | G06F 8/67 717/140 |
| 2012/0272210 | A1* | 10/2012 | Ni | G06F 8/52 717/140 |
| 2014/0208301 | A1* | 7/2014 | Guan | G06F 9/4425 717/140 |

OTHER PUBLICATIONS

Choi, et al., "Stack Allocation and Synchronization Optimizations for Java Using Escape Analysis"; 2003 ACM; [retrieved on Jun. 27, 2016]; Retrieved from Internet <URL:http://dl.acm.org/citation.cfm?id=945892>;pp. 876-910.*

Cheng, et al., "DBTG: Demand-driven Backtracking Test Generation"; 2008 IEEE; [retrieved on Jun. 27, 2016]; Retrieved from Internet <URL:http://ieeexplore.ieee.org/stamp/stamp.jsp?tp=&arnumber=4709271>;pp. 1944-1950.*

Lee, et al., "Aggressive Function Splitting for Partial Inlining"; 2011 IEEE; [retrieved on Jun. 27, 2016]; Retrieved from Internet <URL:http://ieeexplore.ieee.org/stamp/stamp.jsp?tp=&arnumber=5936700>;pp. 80-86.*

List of IBM Patent or Patent Applications Treated as Related; Sep. 11, 2014; pp. 1-2.

M. Gschwind, et al., "Global Entry Point and Local Entry Point for Callee Function," Related Application, U.S. Appl. No. 14/263,135; Filed Apr. 28, 2014; pp. 1-21.

* cited by examiner

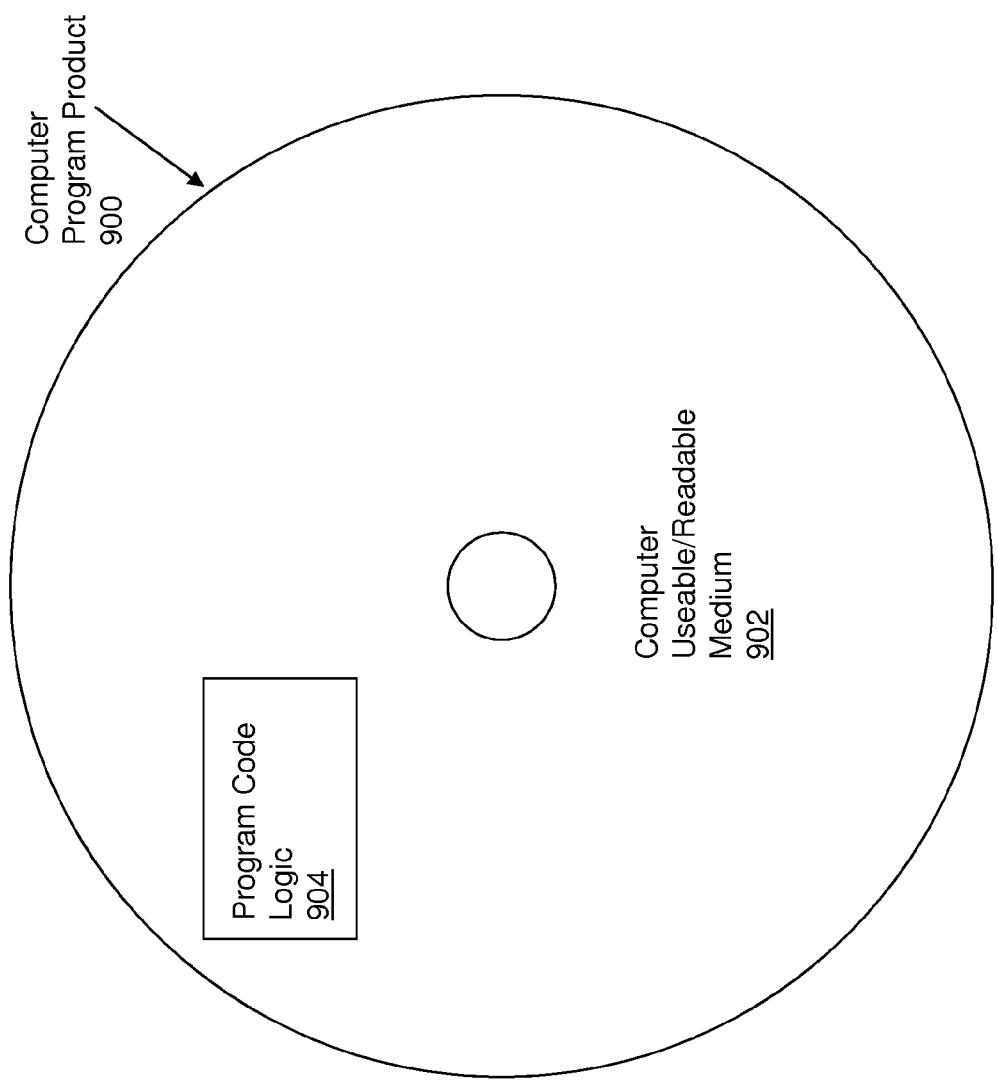

GLOBAL ENTRY POINT AND LOCAL ENTRY POINT FOR CALLEE FUNCTION

CROSS-REFERENCE TO RELATED APPLICATION

This application is a continuation of U.S. application Ser. No. 14/263,135 (Gschwind et al.), filed on Apr. 28, 2014, which is herein incorporated by reference in its entirety.

BACKGROUND

The present invention relates generally to computer systems, and more specifically, to global entry point and local entry point for a callee function.

In computer software, an application binary interface (ABI) describes the low-level interface between an application program and the operating system or between the application program and another application. The ABI cover details such as data type, size, and alignment; the calling conventions which controls how function arguments are passed and how return values are retrieved; the system call numbers and how an application should make system calls to the operating system; and in the case of a complete operating system ABI, the binary format of object files, program libraries, and so on. Several ABIs (e.g., the Interactive Unix ABI allowing to a wide range of programs to run on a variety of Unix and Linux variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program, and loading of the shared libraries for application start-up occurs before the application is executed on a particular hardware platform.

The compiler works on a single source file (compile unit) at a time to generate object files. The compiler generates object code without knowing the final address or displacement of the code/data. Specifically, the compiler generates object code that will access a table of contents (TOC) for variable values without knowing the final size of the TOC or offsets/addresses of various data sections. Placeholders for this information are left in the object code and updated by the linker A TOC is a variable address reference table that is utilized, for example in an AIX environment, to access program variables in a manner that supports shared libraries and is data location independent. A similar structure, referred to as a global offset table (GOT), performs a similar function (e.g., indirect and dynamically relocatable access to variables) in a LINUX environment. One difference between a TOC and a GOT is that a TOC may contain actual data, where a GOT only contains addresses (pointers) to data. In the Linux PowerPC 64-bit environment the TOC contains the GOT section plus small data variables.

A static linker combines one or more separately compiled object files derived from distinct source files into a single module, and builds a single GOT and/or TOC for the module that is shared by files in the module. An executing application includes at least one module, a statically linked module typically containing the function main( ) as well as, optionally, several other functions, sometimes also known as the main module. Some applications may be statically linked, that is, all libraries have been statically integrated into the main module. Many applications also make use of shared libraries, sets of utility functions provided by the system or vendors to be dynamically loaded at application runtime and where the program text is often shared between multiple applications.

Each module in a computer program may have a different TOC pointer value. The TOC register or GOT register (referred to hereinafter as the TOC register) may therefore be saved and restored for each function call, either by a procedure linkage table (PLT) stub code segment, or by the callee function in conventions where the TOC register is treated as a preserved (i.e., callee-saved) register.

SUMMARY

Embodiments include a method and computer program product for a global entry point and a local entry point for a callee function. An aspect includes executing, by a processor, a function call from a calling function to the callee function. Another aspect includes based on the function call being a direct and external function call, entering the callee function at the global entry point of the callee function and executing prologue code in the callee function that calculates and stores a table of contents (TOC) value for the callee function in a TOC register. Another aspect includes based on the function call being a direct and local function call, entering the callee function at the local entry point of the callee function, wherein entering the callee function at the local entry point skips the prologue code. Another aspect includes based on the function call being an indirect function call, entering the callee function at the global entry point and executing the prologue code.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 9 depicts a computer-readable medium according to an embodiment.

DETAILED DESCRIPTION

Figure 1:
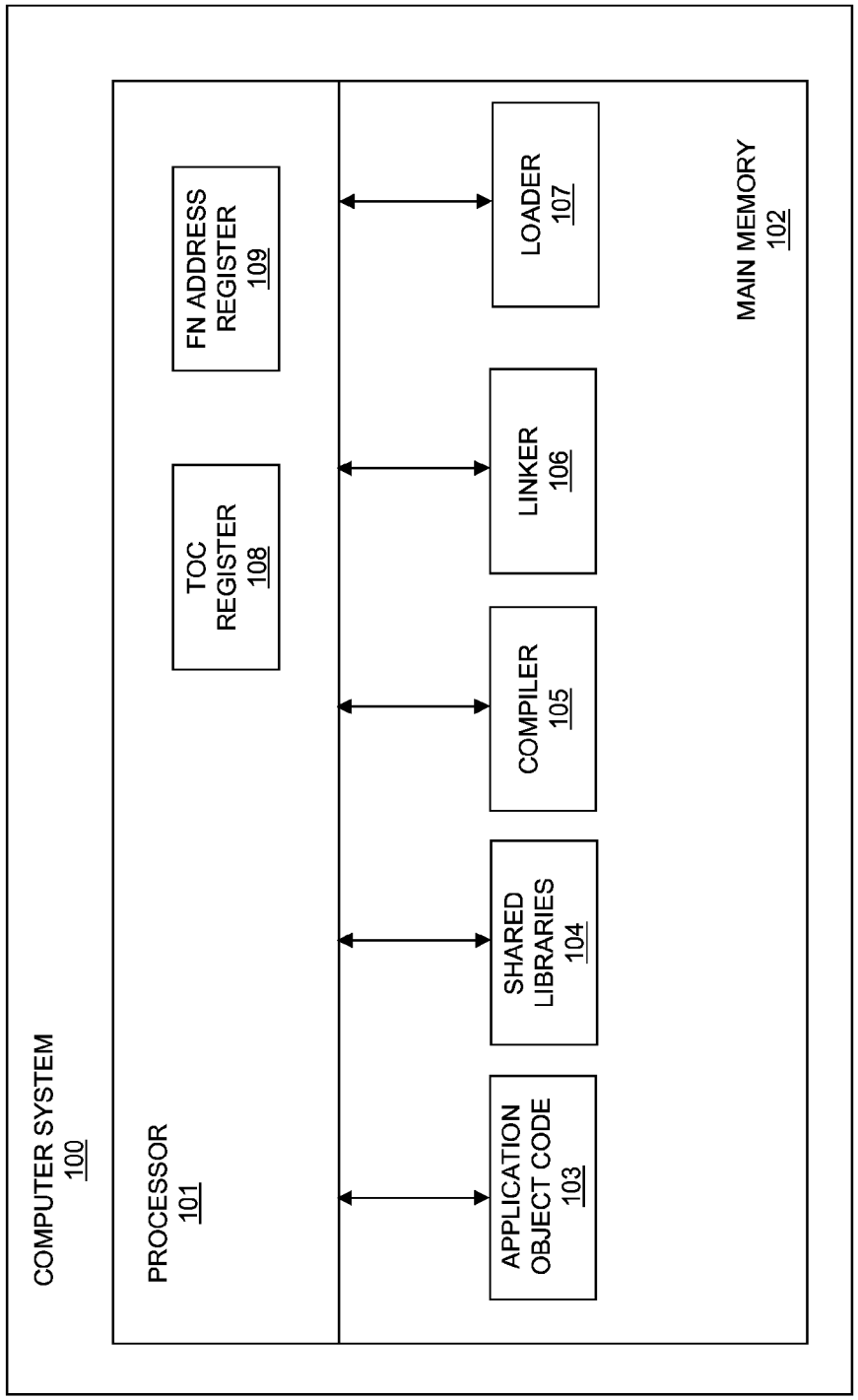
FIG. 1 depicts a computer system for a global entry point and a local entry point for a callee function in accordance with an embodiment.

Embodiments of a global entry point and a local entry point for a callee function are provided, with exemplary embodiments being discussed below in detail. A global entry point, accompanied by prologue code, and a local entry point may be inserted at the beginning of each function in application object code by, for example, a compiler. During runtime, entry into a callee function at the global entry point may trigger the prologue code, which calculates and saves a TOC pointer value for the callee function. Entry into the callee function at the local entry point may skip the TOC-related operations in the prologue code, and the calling function provides the TOC for the callee function in the TOC register. Different types of function calls (i.e., local and direct, external and direct, or indirect) may use different entry points into a callee function. The calculation and saving of the TOC pointer value for the callee function may be performed based a value that is stored in a function address register, which may be R12 in some embodiments. The TOC register may be R2 in some embodiments.

A function call in application object code is either local or external, and also either direct or indirect. For a local function call, from a calling function to a callee function that is in the same module as the calling function, the TOC pointer value is the same for the calling function and the callee function. For an external function call, from a calling function to a callee function that is in a different module from the calling function, the TOC pointer value is different for the calling function and the callee function. Whether a function call is local or external is determined at resolution time, which may occur at various times, e.g., at compile time, link time, or load time. When the type of a function call is resolved, a branch to the appropriate entry point (i.e., local or global) may be inserted in conjunction with the function call. Whether a function call is direct or indirect is indicated in the source code. A direct function call refers to the callee function by its symbol, or name. An indirect function call refers to the callee function by a function pointer which holds a value of an address corresponding to the callee function; the value of the function pointer may change during execution of the application object code.

For a direct, local function call, the calling function provides the TOC for the callee function in the TOC register; therefore, for a direct, local function call, the local entry point into the callee function is used. For a direct, external function call, the calling function does not know the TOC for the callee function; therefore, for a direct, external function call, the global entry point into the callee function is used. For an indirect function call, it is not known in advance whether the function call will be local or external; therefore, for an indirect function call, the global entry point into the callee function is also used. In further embodiments, if a callee function does not require a TOC, regardless of the type of the function call, the local entry point into the callee function is used.

FIG. 1 illustrates an embodiment of a computer system 100 for local and global entry points for a callee function. Computer system 100 comprises a processor 101 and a main memory 102. Application object code 103, which is generated from program source code (not shown) by a compiler such as compiler 105, comprises a plurality of functions, and is stored in main memory 102 for execution by processor 101. The application object code 103 may be generated by a compiler that is located on a different computer system from computer system 100. Shared library code 104 comprise functions that are external to application object code 103 and that may be called during execution of application object code 103 via external function calls (i.e., calls to functions in other modules). Linker 106 and loader 107 comprise runtime components; the linker 106 links the application object code 103 before the application object code 103 is executed by the loader 107. TOC register 108 is located in processor 101. TOC register 108 stores a current value of a TOC pointer for the currently active function of application object code 103 or shared library code 104 (i.e., the function that is currently executing). The TOC register 108 may be general purpose register R2 in some embodiments. In further embodiments of a computer system such as computer system 100, the TOC register 108 may store a GOT value instead of a TOC pointer value. Function address register 109 is also located in processor 101, and holds an address of a currently executing function. Function address register 109 may be general purpose register R12 in some embodiments. In some embodiments, the computer system 100 may further comprise another object code module that is distinct from the application object code 103 and the shared library code 104, and the other object code module may also contain functions that are called by application object code 103 via external function calls.

Figure 2:
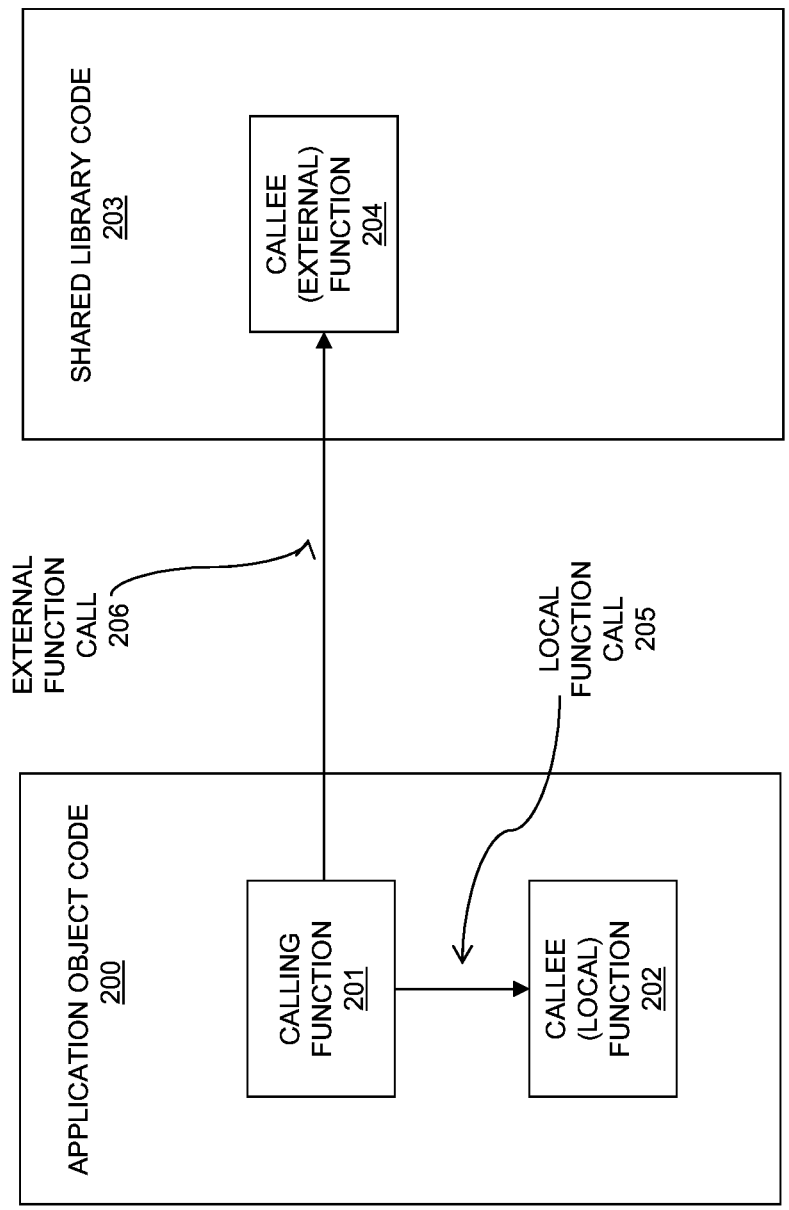
FIG. 2 depicts local and external function calls accordance with an embodiment.

FIG. 2 illustrates an embodiment of a local function call 205 and an external function call 206. Application object code 200 may comprise application object code 103 of FIG. 1, and shared library 203 may comprise shared library code 104 of FIG. 1. Calling function 201 and callee function 202 are part of application object code 200, and callee function 204 is part of shared library 203. If the calling function 201 and the callee function 202 are both part of application object code 200, the callee function 202 is local to the calling function 201 and the call is a local function call 205, and the calling function 201 and the callee function 202 have the same TOC pointer value. If the calling function 201 is part of the application object code 200, and the callee function 204 is in the shared library 203, then the callee function 204 is external to the calling function 201 and the call is an external function call 206, and the calling function 201 and the callee function 204 have different TOC pointer values. When calling function 201 performs an external function call to callee function 204, when execution passes from the calling function 201 to the callee function 204, the value of the TOC pointer of the calling function 201 is saved from TOC register 108 to a stack frame corresponding to the calling function 201 in the runtime stack, and the TOC pointer value of callee function 204 is stored in TOC register 108. When the callee function 204 exits and execution passes back to the calling function 201, the value of the TOC pointer of the calling function 201 is restored to the TOC register 108 from the stack frame corresponding to the calling function 201. FIG. 2 is shown for illustrative purposes only; any number of functions may be included in application object code 200 and shared library 203, and these functions may call one another in any appropriate manner. In some embodiments, the computer system 100 may further comprise another object code module that is distinct from the application object code 103/200 and the shared library code 104/203, and the other object code module may also contain functions that are called by application object code 103/200 via external function calls such as external function call 206. There may also be local function calls between functions that are both within the same shared library code 104/203.

Figure 3:
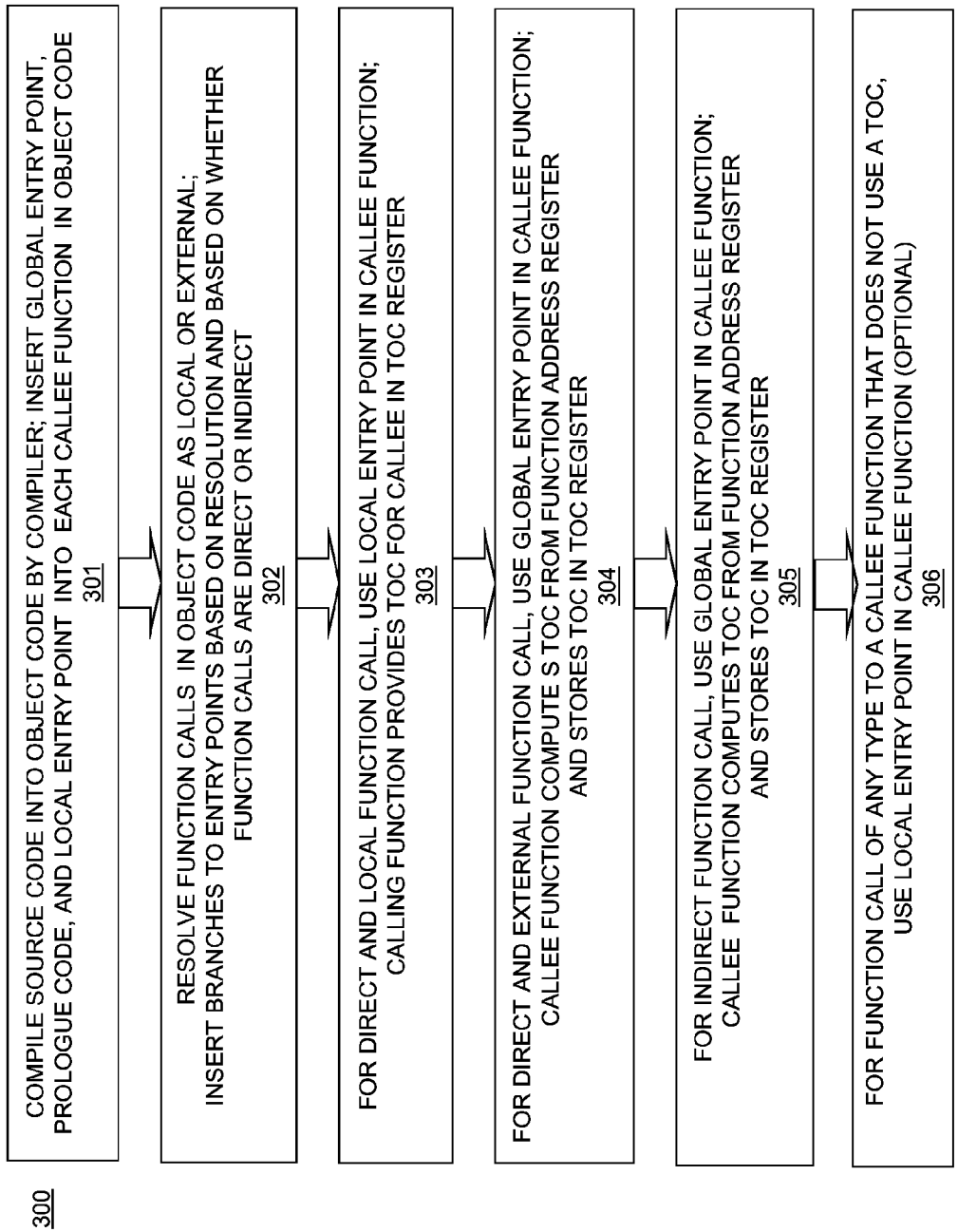
FIG. 3 depicts a process flow for a global entry point and a local entry point for a callee function in accordance with an embodiment.

FIG. 3 illustrates an example of a method 300 for a global entry point and a local entry point for a callee function in accordance with an embodiment. FIG. 3 is discussed with reference to FIGS. 1 and 2. First, in block 301, before runtime, a compiler, such as compiler 105, generates application object code 103 (and, in some embodiments, shared library code 104) from program source code (not shown). The compiler that generates application object code 103 (and, in some embodiments, shared library code 104) may be located on another computer system that is distinct from computer system 100. In some embodiments, another compiler on a third distinct computer may generate shared library code 104. During compilation, the compiler 105 inserts a global entry point at the beginning of each callee function, followed by prologue code comprising instructions to compute and save the TOC for the callee function, followed by a local entry point. The main body of a function is located after its local entry point. It is also indicated in the program source code whether each function call is direct or indirect; a direct function call calls the calling function by name, while an indirect function call references a function pointer. Next, in block 302, the function calls in the calling functions in the application object code 103 are resolved as being local or external. The resolving may be performed by compiler 105, linker 106, or loader 107, in various embodiments; resolution may occur at different times for different function calls in the same application object code 103. At the time of resolution of a function call, the compiler 105, linker 106, or loader 107 inserts instructions that branch from the function call in the calling function to the global entry point or the local entry point of the callee function of the function call, depending on the type of function call (e.g., direct and local, direct and external, or indirect), in addition to other instructions, such as PLT stubs, as needed. This is discussed in further detail with respect to blocks 303-306, and FIGS. 4-8.

Blocks 303-305, and, optionally, block 306, are performed during execution of the application object code 103; for each function call that is encountered during execution of application object code 103, one of blocks 303-306 is performed. In block 303, a direct and local function call is executed. For the direct and local function call, the caller and callee functions have the same TOC, which is provided by the calling function for the callee function in the TOC register 108. Therefore, the function call in the caller function branches to the local entry point in the callee function, skipping the global entry point and the prologue code comprising the callee TOC computation and save instructions. Various examples of direct and local function calls are discussed below with respect to FIGS. 4-6.

In block 304, a direct and external function call is executed. For the direct and external function call, the caller and callee functions have different TOC values, so the callee function must calculate its TOC and store the calculated TOC in the TOC register 108. Therefore, the function call in the caller function branches to the global entry point in the callee function, executes the prologue code to perform TOC computation and save the computed TOC in the TOC register 108, and then proceed past the local entry point into the body of the callee function. An example of a direct and external function call is discussed below with respect to FIG. 7.

In block 305, an indirect function call is executed. For the indirect function call, the TOC value of the callee function is not known in advance, so the callee function must calculate its TOC and store the calculated TOC in the TOC register 108. Therefore, the function call in the caller function branches to the global entry point in the callee function, executes the prologue code to perform TOC computation and save the computed TOC in the TOC register 108, and then proceeds past the local entry point into the body of the callee function. An example of an indirect function call is discussed below with respect to FIG. 8. Lastly, in block 306, a function call to a callee function that does not use a TOC is executed. In some embodiments, for such a function call, the local entry point in the callee function is used, regardless of the type of the function call. In further embodiments, the compiler may determine at compile time that the callee function does not use a TOC, and, based on that determination, omit insertion of the prologue code into the callee function during block 301.

Figure 4:
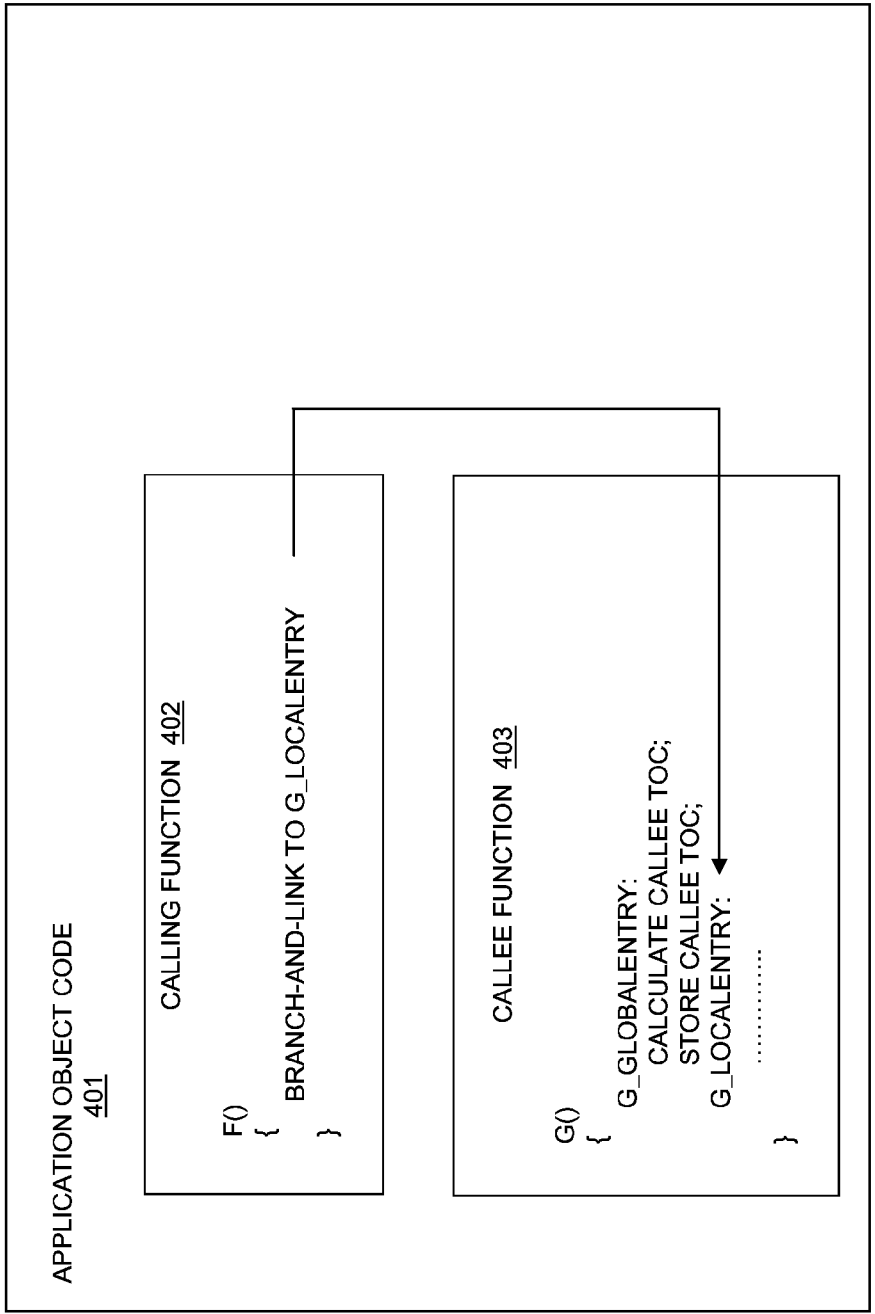
FIGS. 4-6 illustrate examples of use of a local entry point for a local and direct function call.
Figure 5:
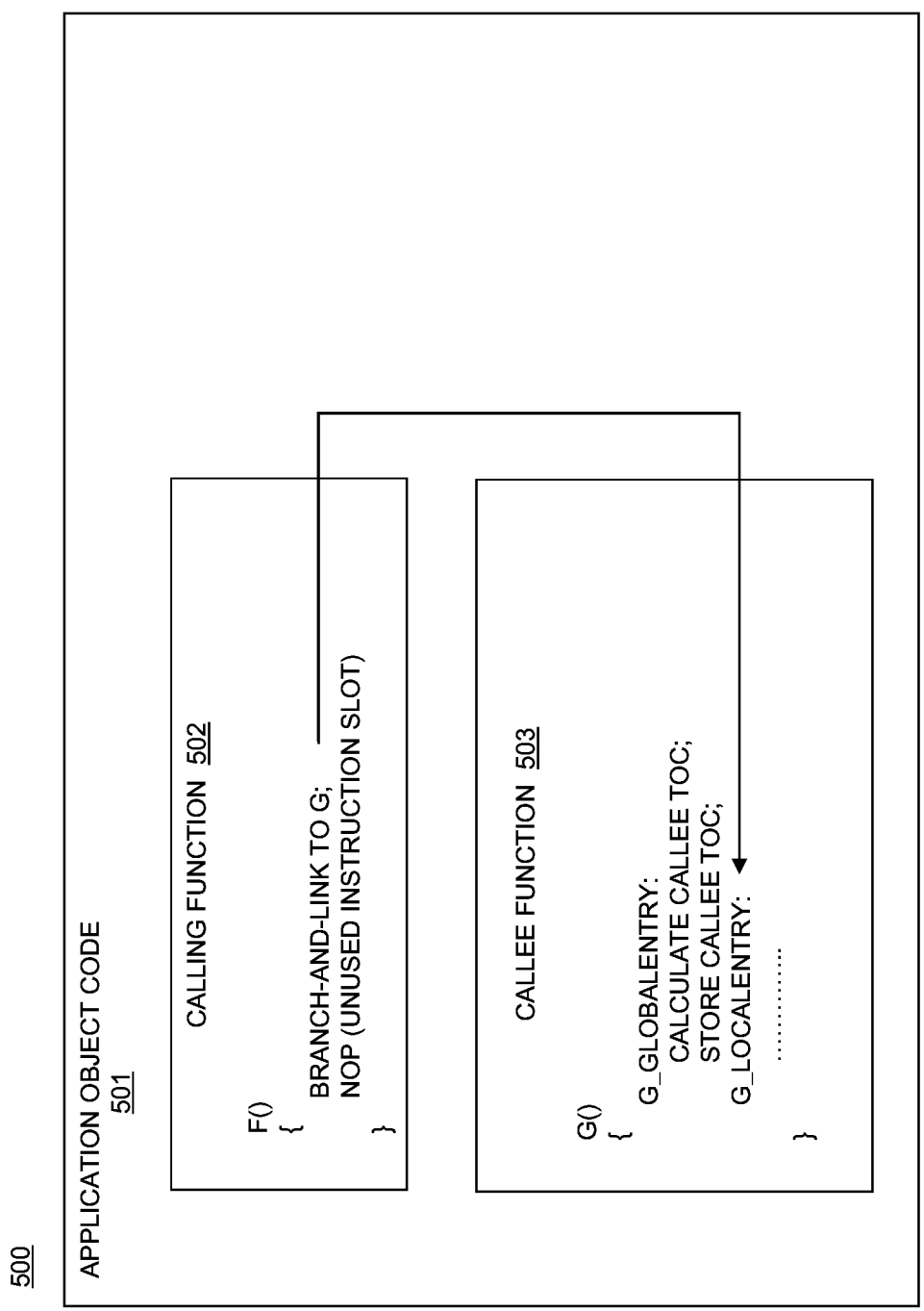
Figure 6:
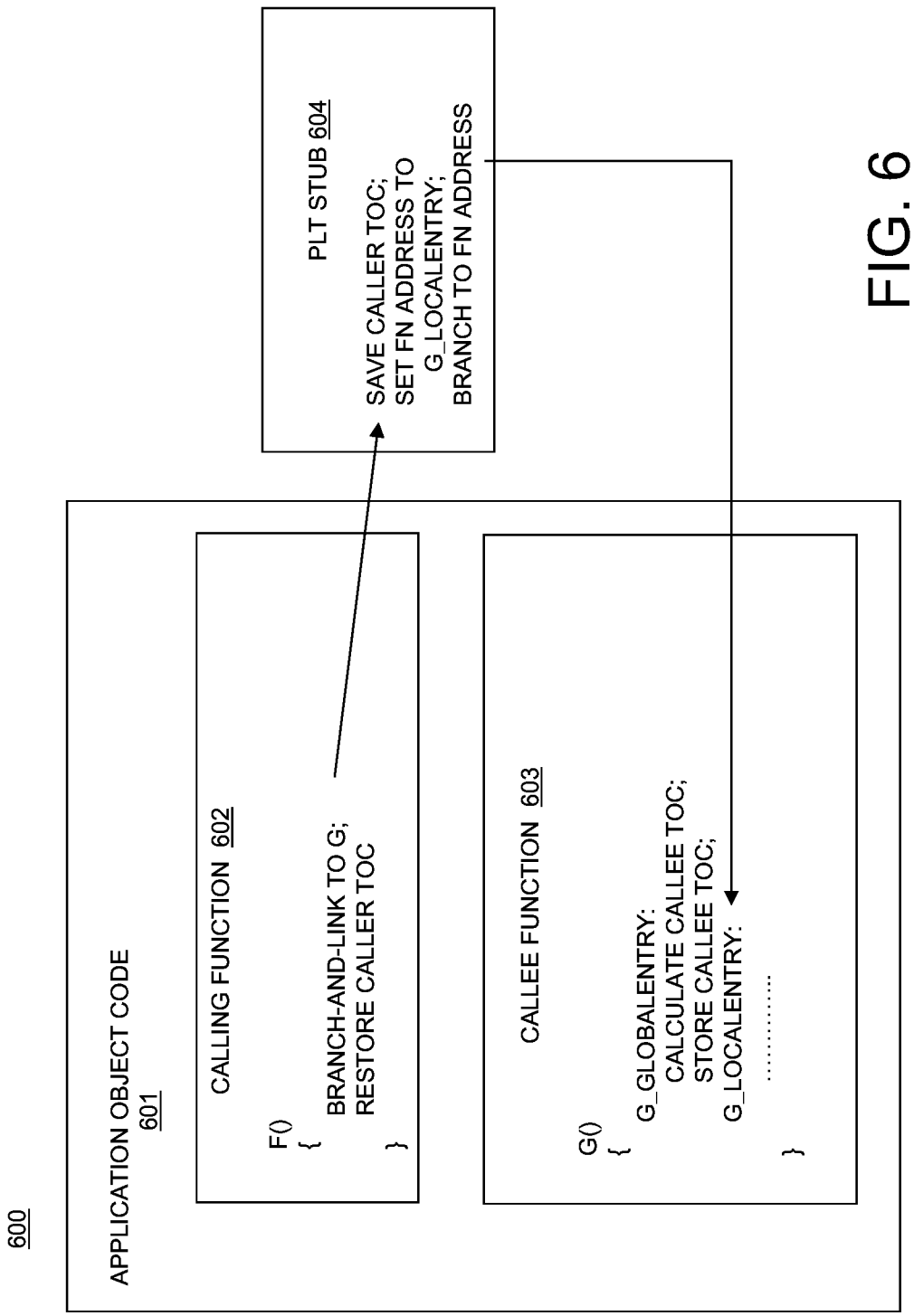

FIGS. 4-6 illustrate examples of use of a local entry point for a local and direct function call; in FIGS. 4-6, resolution of the function call occurs at different times, e.g., compile time, which is earliest, link time, or load time, which is latest. In each of FIGS. 4-6, the calling function and the callee function have the same TOC, and the TOC is provided for the callee function by the calling function in the TOC register 108. In example 400 of FIG. 4, resolution that the function call from calling function F( ) 402 to callee function G( ) 403 is a local function call (i.e., F( ) and G( ) are both in application object code 401) occurs during compile time. The function call from calling function F( ) 402 to callee function G( ) 403 is also determined to be a direct function call because G( ) is called in F( ) by name. Therefore, the compiler 105 inserts a direct branch to the local entry point in callee function G( ) 403 into calling function F( ) during compilation. For the function call from F( ) to G( ), the global entry point in function G( ) 403, and the prologue code that performs computation and storage of the TOC for function G( ) 403, are skipped.

In example 500 of FIG. 5, resolution that the function call from calling function F( ) 502 to callee function G( ) 503 is a local function call (i.e., F( ) and G( ) are both in application object code 501) occurs during link time. The function call from calling function F( ) 502 to callee function G( ) 503 is also determined to be a direct function call because G( ) is called in F( ) by name. Therefore, the linker 106 inserts a branch to the local entry point in callee function G( ) 503 into calling function F( ) during link time. For the function call from F( ) to G( ), the global entry point in G( ) 503, and the prologue code that performs computation and storage of the TOC for G( ) 503, are skipped.

In example 600 of FIG. 6, resolution that the function call from calling function F( ) 602 to callee function G( ) 603 is a local function call (i.e., F( ) and G( ) are both in application object code 601) occurs during load time. The function call from calling function F( ) 602 to callee function G( ) 603 is also determined to be a direct function call because G( ) is called in F( ) by name. Therefore, the linker 106 generates a PLT stub 604 and inserts a branch to the PLT stub 604 into calling function F( ) 602. The PLT stub 604 stores the TOC of the calling function F( ) 602 in the stack frame associated with F( ) in the runtime stack, loads a final destination address to be determined by the loader 107 at load time into the function address register 109, and then branches to the address in the function address register 109. In this example, the loader 107 determines that the address of the local entry point in callee function G( ) 603 should be used. The linker 106 also inserts code into the calling function F( ) to restore its TOC from the stack frame associated with F( ) in the runtime stack after the call to G( ) has returned. For the function call from F( ) to G( ), the global entry point in G( ) 603, and the prologue code that performs computation and storage of the TOC for G( ) 603, are skipped.

Figure 7:
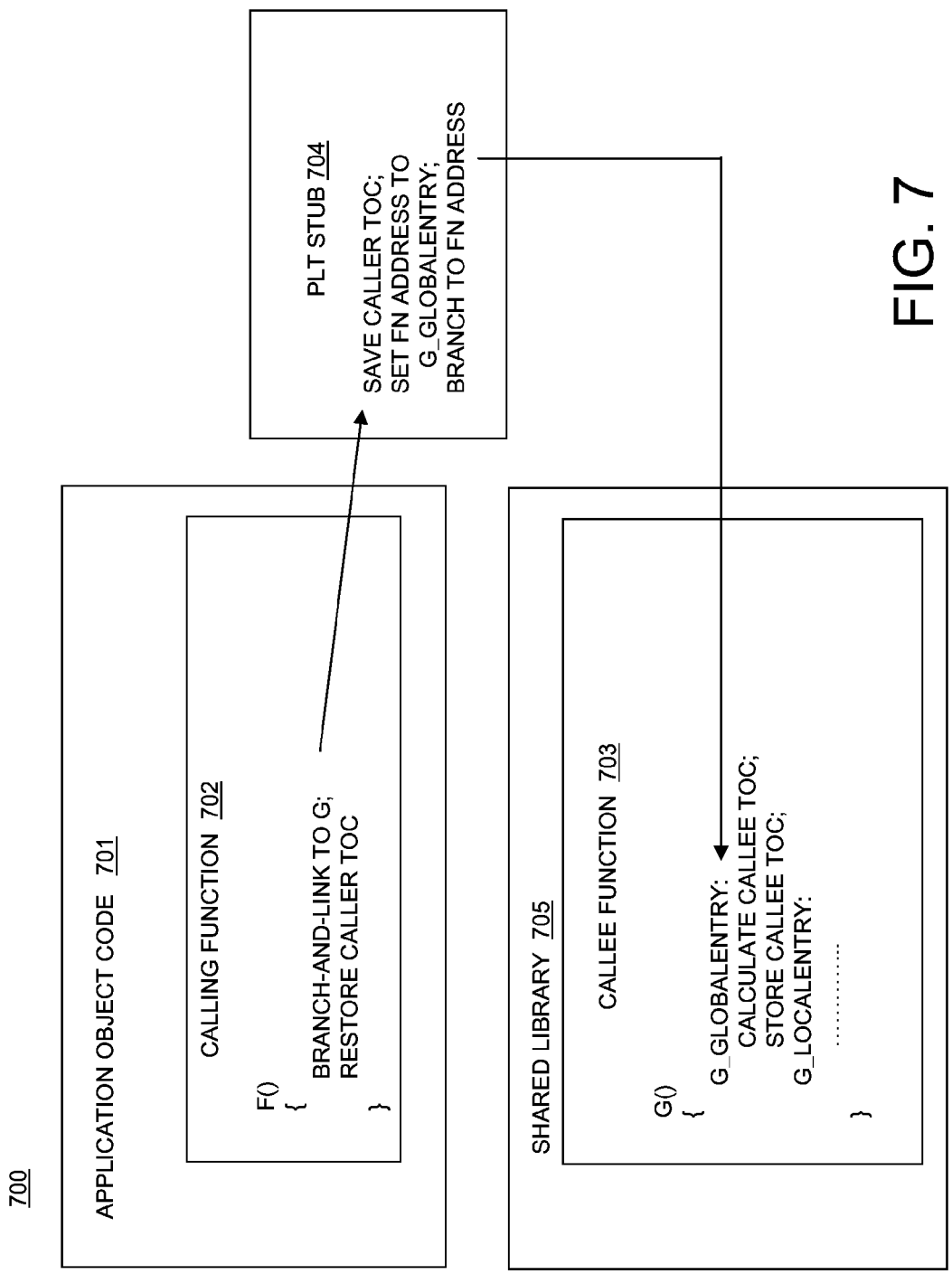
FIG. 7 illustrates an example of use of a global entry point for an external and direct function call.

FIG. 7 illustrates an example of use of a global entry point for an external and direct function call. In example 700 of FIG. 7, resolution that the function call from calling function F( ) 702 to callee function G( ) 703 is an external function call (i.e., F( ) and G( ) are in the different respective modules, e.g., application object code 701 and shared library 705) occurs during load time. The function call from calling function F( ) 702 to callee function G( ) 703 is also determined to be a direct function call because G0 is called in F( ) by name. Therefore, the linker 106 generates a PLT stub 704 and inserts a branch to the PLT stub 704 into calling function F( ) 702. The PLT stub 704 stores the TOC of the calling function F( ) 702 in the stack frame associated with F( ) in the runtime stack, loads a final destination address to be determined by the loader 107 at load time into the function address register 109 and then branches to the address in the function address register 109. In this example, the loader 107 determines that address of the global entry point in callee function G( ) 703 should be used. The linker 106 also inserts code into the calling function F( ) to restore its TOC from the stack frame associated with F( ) in the runtime stack after the call to G( ) has returned. After entering callee function G( ) 703 at the global entry point, the prologue code performs calculation of the TOC for callee function G( ) 703 and storing of the calculated TOC in the TOC register 108 before proceeding with execution of the callee function G( ) 703. The TOC for callee function G( ) 703 may be calculated based on adding an offset value to the value that is stored in the function address register 109.

Figure 8:
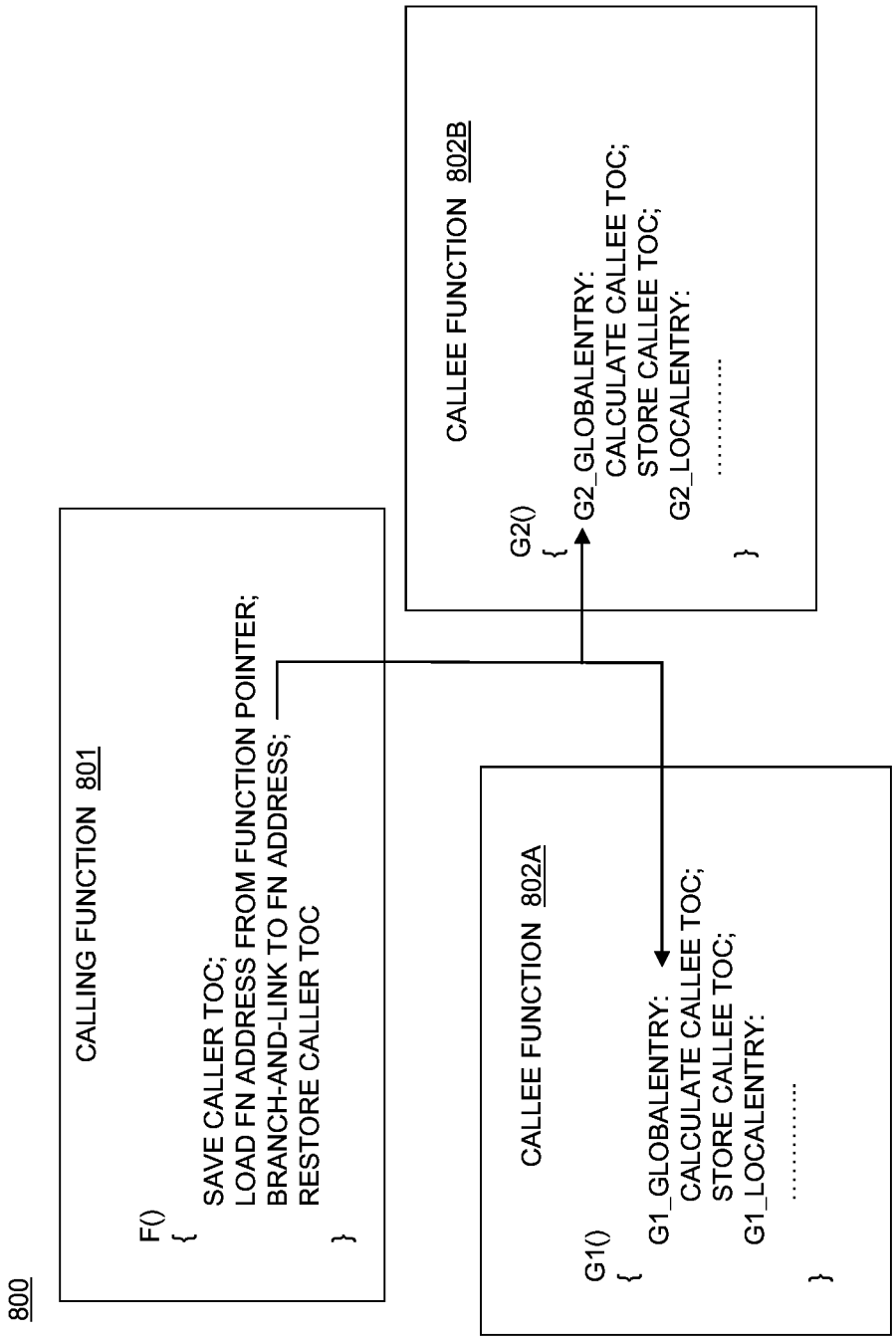
FIG. 8 illustrates an example of use of a global entry point for an indirect function call.

FIG. 8 illustrates an example of use of a global entry point for an indirect function call. In example 800 of FIG. 8, it is determined that the function call from calling function F( ) 802 to callee function G1( ) 802A or callee function G2( ) 802B is an indirect function call (i.e., the function call in F( ) is a reference to a pointer that holds an address that points to the callee function; the pointer value may be changed during execution) occurs during compile time. In various embodiments, calling function F( ) 802, callee function G1( ) 802A, and callee function G2( ) 802B may be in the same module, or in different modules. The compiler 105 inserts an instruction into the calling function F( ) 801 to store the TOC of the calling function F( ) 801 in the stack frame associated with F( ) in the runtime stack, load the address that is stored in the function pointer (PTR) into the function address register 109, and then branch to the loaded address, which branches to the global entry point in either callee function G1( ) 802A or G2( ) 802B. The compiler 105 also inserts an instruction into the calling function F( ) to restore its TOC from the stack frame associated with F( ) after the call has returned. In each of callee functions G1( ) 802A or G2( ) 802B, the TOC for the callee function is calculated and stored in the TOC register 108 by the prologue code before proceeding with execution of callee function G1( ) 802A or G2( ) 802B. The TOC for callee function G1( ) 802A or G2( ) 802B may be calculated based on adding an offset value to the value that is stored in the function address register 109.

Technical effects and benefits include reduction in unnecessary TOC operations during execution of application object code.

Referring now to FIG. 9, in one example, a computer program product 900 includes, for instance, one or more storage media 902, wherein the media may be tangible and/or non-transitory, to store computer readable program code means or logic 904 thereon to provide and facilitate one or more aspects of embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for a global entry point and a local entry point for a callee function, the method comprising:

executing, by a processor, a function call from a calling function to the callee function, the executing comprising:

based on the function call being a direct and external function call, entering the callee function at the global entry point of the callee function and executing prologue code in the callee function that calculates and stores a table of contents (TOC) value for the callee function in a TOC register, wherein the TOC value for the callee function is calculated by the prologue code based on a function address register and an offset;

based on the function call being a direct and local function call, entering the callee function at the local entry point of the callee function, wherein entering the callee function at the local entry point skips the prologue code; and based on the function call being an indirect function call, entering the callee function at the global entry point and executing the prologue code;

wherein the global entry point, prologue code, and local entry point are inserted into the callee function by a compiler, such that the compiler inserts the global entry point at the beginning of the calling function, inserts the prologue code directly after the global entry point, and inserts the local entry point directly after the prologue code and before body of the callee function.

2. The method of claim 1, wherein whether the function call is a local function call is resolved by a compiler or a linker, and wherein, based on the function call being the direct and local function call, a direct branch to the local entry point in the callee function is inserted into the calling function by the compiler or the linker.

3. The method of claim 1, wherein whether the function call is a local function call is resolved by a loader, and wherein, based on the function call being the direct and local function call, a branch to a procedure linkage table (PLT) stub is inserted into the calling function by the linker, and the PLT stub branches to the local entry point in the callee function.

4. The method of claim 1, wherein whether the function call is an external function call is resolved by a loader, and wherein, based on the function call being the direct and external function call, a branch to a procedure linkage table (PLT) stub is inserted into the calling function by the linker, and the PLT stub branches to the global entry point in the callee function.

5. The method of claim 1, wherein the calling function loads a function pointer address that points to the global entry point in the callee function based on the function call being the indirect function call.

6. The method of claim 1, further comprising, based on the callee function comprising a function that does not use a TOC, entering the callee function at the local entry point.

7. A computer program product for implementing a global entry point and a local entry point for a callee function, the computer program product comprising:

a computer readable storage medium having program instructions embodied therewith, the program instructions readable by a processing circuit to cause the processing circuit to perform a method comprising:

executing, by a processor, a function call from a calling function to the callee function, the executing comprising:

based on the function call being a direct and external function call, entering the callee function at the global entry point of the callee function and executing prologue code in the callee function that calculates and stores a table of contents (TOC) value for the callee function in a TOC register, wherein the TOC value for the callee function is calculated by the prologue code based on a function address register and an offset;

based on the function call being a direct and local function call, entering the callee function at the local entry point of the callee function, wherein entering the callee function at the local entry point skips the prologue code; and based on the function call being an indirect function call, entering the callee function at the global entry point and executing the prologue code;

wherein the global entry point, prologue code, and local entry point are inserted into the callee function by a compiler, such that the compiler inserts the global entry point at the beginning of the calling function, inserts the prologue code directly after the global entry point, and inserts the local entry point directly after the prologue code and before body of the callee function.

8. The computer program product of claim 7, wherein whether the function call is a local function call is resolved by a compiler or a linker, and wherein, based on the function call being the direct and local function call, a direct branch to the local entry point in the callee function is inserted into the calling function by the compiler or the linker.

9. The computer program product of claim 7, wherein whether the function call is a local function call is resolved by a loader, and wherein, based on the function call being the direct and local function call, a branch to a procedure linkage table (PLT) stub is inserted into the calling function by the linker, and the PLT stub branches to the local entry point in the callee function.

10. The computer program product of claim 7, wherein whether the function call is an external function call is resolved by a loader, and wherein, based on the function call being the direct and external function call, a branch to a procedure linkage table (PLT) stub is inserted into the calling function by the linker, and the PLT stub branches to the global entry point in the callee function.

11. The computer program product of claim 7, wherein the calling function loads a function pointer address that points to the global entry point in the callee function based on the function call being the indirect function call.

* * * * *